United States Patent [19]

Henson, Sr.

[11] Patent Number: 4,779,478
[45] Date of Patent: Oct. 25, 1988

[54] ADJUSTABLE REAR VIEW MIRROR

[76] Inventor: Thomas M. Henson, Sr., 10718 Moosberger Ct., Columbia, Md. 21044

[21] Appl. No.: 930,897

[22] Filed: Nov. 17, 1986

[51] Int. Cl.⁴ .................................................. F16C 1/10
[52] U.S. Cl. ...................................... 74/502.1; 248/486
[58] Field of Search ........................ 74/501 M, 501 R; 248/479, 486, 476; 350/632, 631

[56] References Cited

U.S. PATENT DOCUMENTS

| | | | |
|---|---|---|---|
| 2,330,444 | 9/1943 | Park | 74/501 M |
| 2,626,539 | 1/1953 | Peterson | 74/501 M |
| 2,696,142 | 12/1954 | Langford | 74/501 M |
| 3,261,226 | 7/1966 | Dent | 74/501 M |
| 3,277,678 | 10/1966 | Booth | 74/501 M |
| 3,476,464 | 11/1969 | Clark | 74/501 M |
| 3,480,355 | 11/1969 | Smith | 74/501 M |
| 3,537,778 | 11/1970 | Kurz, Jr. | 74/501 M |
| 3,545,290 | 12/1970 | McCord et al. | 74/501 M |
| 3,724,928 | 4/1973 | Olsen et al. | 74/501 M |
| 3,761,164 | 9/1973 | McKee et al. | 74/501 M |
| 4,157,862 | 6/1979 | Jackson | 74/501 M |
| 4,229,992 | 10/1980 | McKee et al. | 74/501 M |
| 4,388,840 | 6/1983 | Manzoni | 74/501 M |

Primary Examiner—Gary L. Smith
Assistant Examiner—Rodney M. Lindsey
Attorney, Agent, or Firm—Gilden & Israel

[57] ABSTRACT

An adjustable rear view mirror is particularly adapted for use with truck trailers and is moveable both outwardly and angularly with respect to the truck cab to thus maintain a clear view towards the rear of the trailer. The mirror assembly utilizes a double cable control with one such cable moving the entire mirror housing outwardly during a turning of the trailer, and the other cable control then rotating the mirror into a desired viewing angle. Both cable controls utilize screw operators, and they may be manually or motor controlled.

6 Claims, 2 Drawing Sheets

ADJUSTABLE REAR VIEW MIRROR

BACKGROUND OF THE INVENTION

1. Field of the Invention

The present invention relates to adjustable rear view mirrors, and more particularly pertains to an adjustable rear view mirror assembly which is particularly designed for use with truck trailers.

2. Description of the Prior Art

Adjustable rear view mirrors for vehicles are well known in the art. In this respect, a number of these mirror constructions are now used on vehicles, while a substantially large number of patents have issued to various designs which are not presently commercially available. Typically, most of these adjustable rear view mirror assemblies utilize various mechanical operators to effect the angular positioning of a mirror within a mounted bracket. For example, U.S. Pat. No. 3,416,854, which issued to P. Fykes on Dec. 17, 1968, discloses a remotely adjustable rear view mirror that is actuated by a pneumatic operator. This mirror assembly provides for an angularly adjustable mirror mounted in a bracket attached to the truck cab, with the operator then being able to manually operate the drive to rotate the mirror to a desired angle. The Fykes mirror assembly is illustrative of a number of operably moveable mirrors attached to trucks which are controlled by the operator from within the truck cab. While these mirrors are functional to the extent that they accomplish the desired result, as evidenced by the complexity of the Fykes design, very few of these prior art mirror assemblies have ever been commercially developed. Further, these prior art adjustable rear view mirror assemblies are not particularly well adapted for use with substantially long trailers associated with trucks, inasmuch as during the backing up of the trailer, the angular alignment of the truck with respect to its cab reaches a position where a conventional rear view mirror assembly can no longer be rotated to view the rear of the trailer. This is occasioned by the fact that some means must be provided for moving the mirror assembly outwardly from the cab before a rotation of the mirror will reach the desired viewing angle.

There has been some recognition of this problem as evidenced by the issuance of U.S. Pat. No. 3,390,937, which was awarded to C. Nicholson on July 2, 1968. The Nicholson rear view mirror assembly includes mounting means attachable to a truck cab wherein such mounting means include two different types of adjustment. A first adjustment facilitates the movement of the mirrors outwardly from the truck cab, while a second adjustment mechanism is then provided to rotate the mirrors to a desired viewing angle such as might be required during a backing up of the associated trailer. However, the Nicholson device has apparently never met with commercial success, most likely due to the substantial complexities of construction as evidenced by the description in the patent as issued.

As such, it can be appreciated that there exists a continuing need for new and improved adjustable mirror assemblies which permit such assemblies to be rapidly and efficiently moved into desired viewing angles on tractor trailer trucks, and in this respect, the present invention substantially fulfills this need.

SUMMARY OF THE INVENTION

In view of the foregoing disadvantages inherent in the known types of adjustable rear view mirror assemblies now present in the prior art, the present invention provides an improved adjustable rear view mirror assembly which is particularly adapted for use on tractor trailer trucks. As such, the general purpose of the present invention, which will be described subsequently in greater detail, is to provide a new and improved mirror assembly which has all the advantages of the prior art rear view mirror assemblies and none of the disadvantages. To attain this, the present invention comprises a mounting bracket assembly for a rear view mirror utilizable on a truck cab, wherein such bracket assembly permits an adjustable movement of the associated rear view mirror. A first screw drive operator is utilized to move the mirror and its associated housing outwardly from the truck cab, while a second screw drive assembly is then provided to rotate the mirror into a desired viewing angle. Both screw drive operators may be independently controlled, and in the preferred embodiment, they would be manually adjustable.

There has just been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved adjustable rear view mirror assembly which has all the advantages of the prior art adjustable rear view mirror assemblies and none of the disadvantages.

It is another object of the present invention to provide a new and improved adjustable rear view mirror assembly which may be easily and efficiently manufactured and marketed.

It is a further object of the present invention to provide a new and improved adjustable rear view mirror assembly which is of a durable and reliable construction.

An even further object of the present invention is to provide a new and improved adjustable rear view mirror assembly which is susceptible of a low cost of manufacture with regard to both materials and labor, and which accordingly is then susceptible of low prices of sale to the consuming public, thereby making such adjustable rear view mirror assemblies economically available to the buying public.

Still yet another object of the present invention is to provide a new and improved adjustable rear view mirror assembly which provides in the apparatuses and methods of the prior art some of the advantages thereof, while simultaneously overcoming some of the disadvantages normally associated therewith.

Still another object of the present invention is to provide a new and improved adjustable rear view mirror assembly which is particularly well adapted for providing accurate rear viewing on a tractor trailer.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
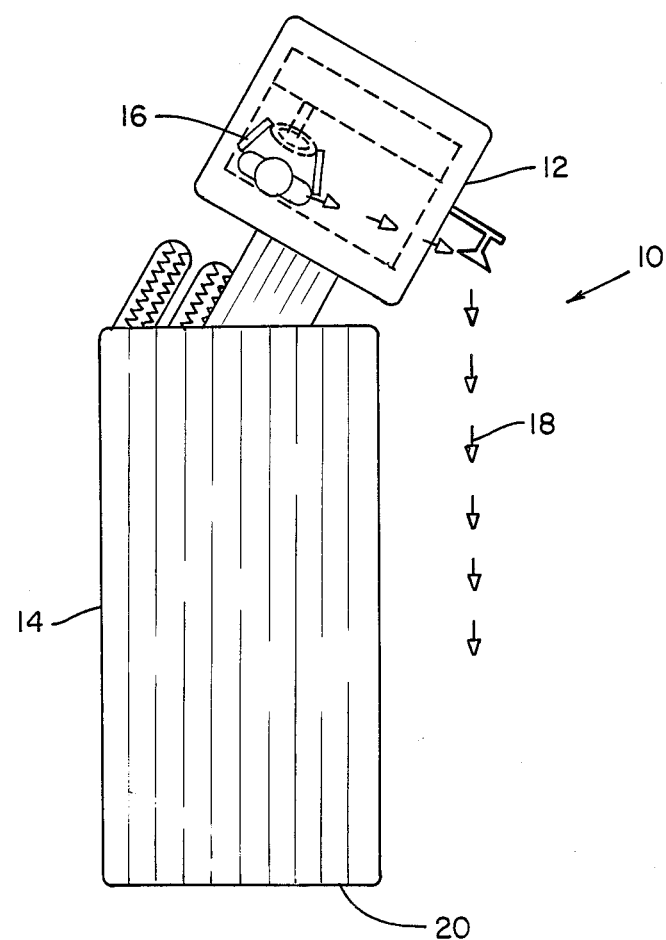
FIG. 1 is a top plan view of a tractor trailer truck which illustrates an operator utilizing a rear view mirror assembly.

With reference now to the drawings and in particular to FIG. 1 thereof, a new and improved adjustable rear view mirror assembly embodying the principles and concepts of the present invention and generally designated the reference numeral 10 will be described.

More specifically it will be noted that the adjustable rear view mirror assembly 10 is designed to be mounted exteriorly of a truck cab 12 of the type designed to move an attached trailer 14. As illustrated, a truck operator 16 should be able to view the adjustable rear view mirror assembly 10 in a direction indicated by the arrows 18, with the adjustable mirror being positionable to permit a viewing at all times of the trailer rear 20.

Figure 2:
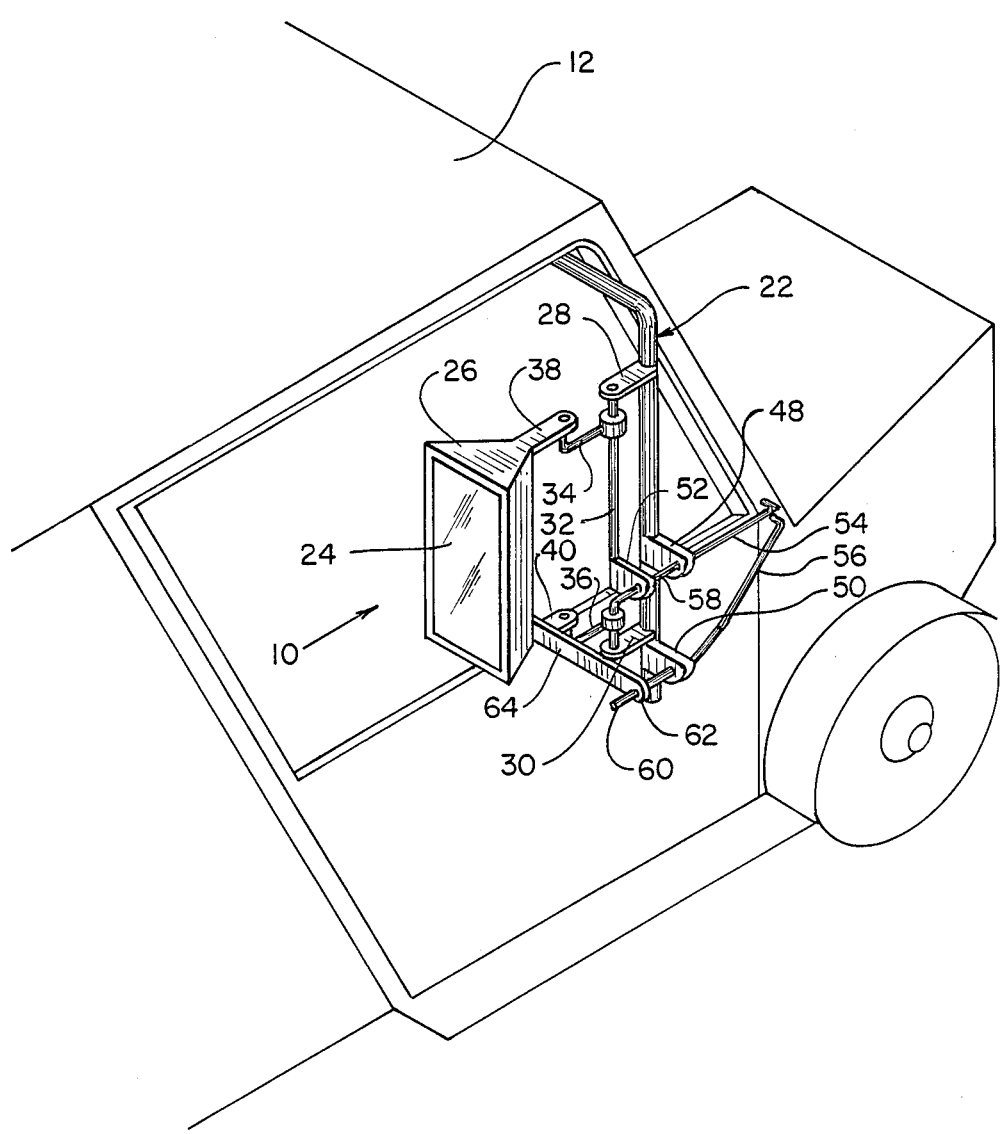
FIG. 2 is a perspective view of the adjustable rear view mirror assembly comprising the present invention.

FIG. 2 of the drawings illustrates the operable components of the adjustable rear view mirror assembly 10 wherein it can be seen that such assembly includes a main bracket support arrangement 22 fixedly securable to a side portion of the cab 12 with a mirror 24 mounted in a housing 26 then being adjustably attached thereto. The bracket 22 may be fixedly secured to the cab 12 by any conventional means, such as by the use of threaded fasteners, and includes a first pair of aligned brackets 28, 30 fixedly secured thereto. A rotatably movable rod 32 is positioned between the brackets 28, 30, with a further pair of support brackets 34, 36 then being fixedly secured to the rod. The housing 26 of the mirror assembly 10 includes outwardly extending supports 38, 40 which are respectively rotatably mounted to the support brackets 34, 36.

Figure 3:
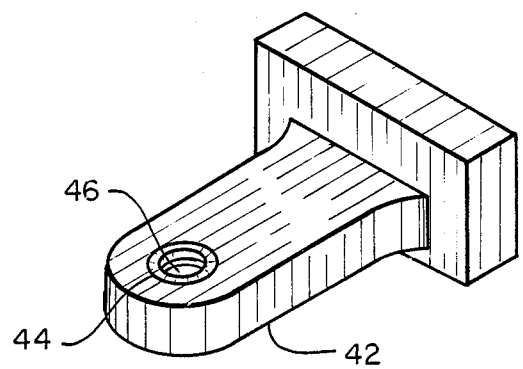
FIG. 3 is a perspective view of a flexible mounting bracket utilized in the construction of the present invention.

FIG. 3 of the drawings illustrates a flexible connector 42, which could be formed from a rubber-like material, having a metallic grommet 44 extending therethrough with such grommet having internal threads 46. The connector 42 is used at several locations in the construction of the combination of the present invention, to include a pair 48, 50 of the connectors extending outwardly from and being fixedly secured from the bracket 22, with a further one of the connectors being fixedly attached to the rod 32 and being designated by the reference numeral 52. As shown in FIG. 2, the connectors 48, 50, 52 can be connected to the mirror assembly 10 by any conventional means, and serve as an operable securing means for a pair of control cables 54, 56. In this regard, control cable 54 extends outwardly from the interior of the cab 12 and includes a threaded end 58 directed through the aligned connectors 48, 52. With the cable 54 being fixedly secured to the connector 48 so as to be rotatably positioned therein without being permitted any axial movement therethrough, the threaded end 58 of the cable 54 positioned through the connector 52 will effect a rotation of the rod 32 in response to an operable rotation of the cable.

The operating cable 56, which also is controlled from an interior portion of the cab 12, is directed through the connector 50 and is rotatable therein without being permitted any further axial movement relative thereto. A threaded end 60 of the cable 56 is directed through a threaded aperture 62 formed in the end of a control rod 64 fixedly secured to the mirror housing 26. As such, a rotatable movement of the operating cable 56 will effect a rotation of a housing 26 about the supports 34, 36.

With respect to the operation of the above-described invention 10, the same should be apparent from the description provided herein. However, a brief summary thereof will be provided. More specifically, when a tractor operator 16 is backing up his trailer 14, the adjustable rear view mirror assembly 10 will move out of viewing alignment whereby a rear portion of the truck trailer 20 cannot be observed. Initially, the operator may wish to move the mirror 24 outwardly from the cab 12, and this is accomplished by a manual rotation of the connecting cable 54, whereby through a threaded movement of the cable through the connectors 48, 52, they are moved towards a juxtaposed position. This of course results in a rotation of the rod 32 in a counter-clockwise direction, which in turn causes the mirror housing 26 to rotate outwardly from the truck cab 12. Once the mirror housing 26 has been moved outwardly from the cab to a sufficient distance, the operator 16 may then effect a rotation of the control cable 56 in a desired direction, whereby the connectors 50, 64 are either moved closer together or further apart. Depending upon the movement of the rod 64 relative to the connector 50, the mirror housing 26 is rotated upon the support members 34, 36 to effect a desired viewing angle.

Inasmuch as the movement of the connectors 48, 52 and 50, 64 towards or away from each other could normally result in the binding of the respective threaded ends 58, 60, such binding is eliminated through the construction of the connectors such as illustrated in FIG. 3. In this regard, the connectors 48, 50, 52 will bend in response to a sensed torque on the threaded ends 58, 60 to eliminate the problem of binding.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as being illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed as being new and desired to be protected by LETTERS PATENT of the United States is as follows:

1. A new and improved adjustable rear view mirror assembly for use on a vehicle, said adjustable rear view mirror assembly comprising:

mirror means for providing a rear viewing of said vehicle by an operator thereof;

support means supporting said mirror means on said vehicle;

first adjustment means for varying a distance between said vehicle and said mirror means connected to said mirror means, said first adjustment means comprising a first control cable controlled from an interior of said vehicle; and second adjustment means connected to said mirror means for rotatably moving said mirror means relative to said support means said second adjustment means comprising a second control cable operably controlled from an interior portion of said vehicle.

2. The new and improved adjustable rear view mirror assembly as described in claim 1, wherein said mirror means is rotatably mounted to said support means by a first rotatable member defining a first rotation axis, said first adjustment means being operable to move said mirror means about said first axis of rotation.

3. The new and improved adjustable rear view mirror assembly as described in claim 2, wherein said mirror means is further mounted to a second rotatable assembly defining a second axis of rotation, said second control cable being operable to rotate said mirror means about said second axis of rotation.

4. The new and improved adjustable rear view mirror assembly as described in claim 3, wherein said first control cable is threadably secured between first and second flexible connectors, said first flexible connector being fixedly secured to said first rotatable member and said second flexible connector being fixedly secured to said support means, said first and second flexible connectors being relatively moveable in response to a rotation of said first control cable.

5. The new and improved adjustable rear view mirror assembly as described claim 4, wherein said first and second flexible connectors are permitted to distort in shape to prevent a binding of said first control cable.

6. The new and improved adjustable rear view mirror assembly as described in claim 5, and further including a third flexible connector fixedly secured to said support means, said second control cable being threadedly secured between said third flexible connector and an outwardly extending arm from said mirror means, a rotation of said second control cable operating to cause relative movement between said arm and said third flexible connector.

* * * * *

UNITED STATES PATENT AND TRADEMARK OFFICE
CERTIFICATE OF CORRECTION

PATENT NO. : 4,779,478

DATED : October 25, 1988

INVENTOR(S) : Thomas M. Henson, Jr.

It is certified that error appears in the above-identified patent and that said Letters Patent is hereby corrected as shown below:

On the title page inventor should read

--(76) Inventor: Thomas M. Henson, Jr.--.

Signed and Sealed this

Tenth Day of April, 1990

Attest:

Attesting Officer

HARRY F. MANBECK, JR.

Commissioner of Patents and Trademarks